Figure 2:
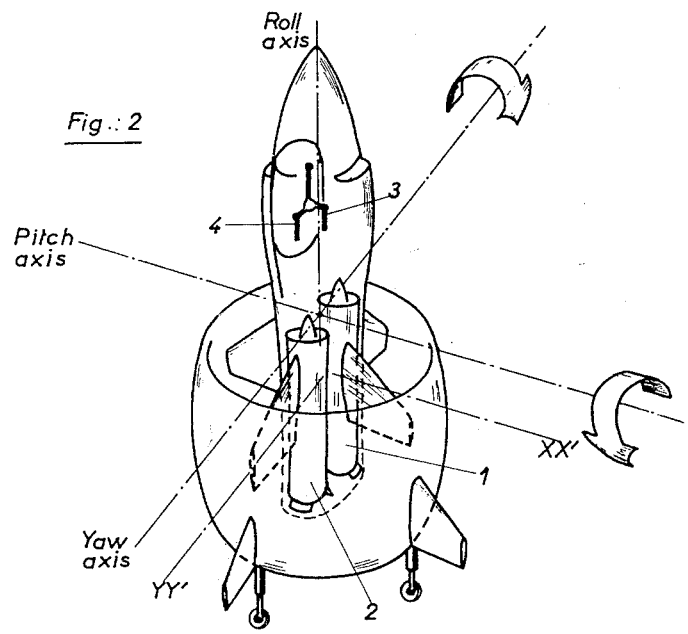

3,045,953
DEVICE FOR STEERING AIRCRAFT DESIGNED FOR VERTICAL FLIGHT
Gerhard Eggers, Dammarie-les-Lys, and Raoul Henri Dumez, Montrouge, France, assignors to Societe Nationale d'Etude et de Construction de Moteurs d'Aviation, Paris, France, a company of France
Filed July 19, 1960, Ser. No. 43,818
Claims priority, application France Aug. 3, 1959
5 Claims. (Cl. 244—52)

The present invention applies to aircraft designed to fly vertically and in which, during the vertical-flight stage or during the phases of flight at a low speed of horizontal translation, the whole or a substantial part of the lifting force is obtained by means of a jet of gas produced for example, by a turbo-reactor or turbo-prop, a channelled blower or helix, or any other rotating machine.

In order to be able to pilot the aircraft during these phases of flight, use is made either of a directional deflection of the lifting jet, or of auxiliary jets suitably arranged so as to produce the necessary controlling couples.

In the majority of cases, such types of apparatus as these are not endowed with inherent stability inasmuch as the rotation through a given small angle produces no restoring couple towards the initial position. Similarly, a speed of rotation about any given axis produces an angular-movement damping-couple which is very small or nil.

In such a case, special stabilization and control devices are employed which, by acting on the devices for the deflection of jets or on the auxiliary jets mentioned above, provide a means of making the machine artificially stable or at least airworthy.

To this end, suitable detectors such as gyrometers, gyroscopes, accelerometers, aerodynamic speed and direction indicators, etc., are employed to detect the angular speeds of rotation, the angular position, and lateral accelerations if necessary. The detectors supply the basic signals, in an electrical form, for example, and, after the required intermediate transformations (amplification, combination, advancing of phase, etc.), the said signals are translated into guiding or steering movements, that is to say, the deflection of the main jet or of the auxiliary jets.

The assembly of these devices is capable of securing perfect conditions of stability and piloting of the machine.

Unfortunately, the low strength of the signal conveyed by the detectors in relation to the effect produced, namely that of the couples acting on the aircraft, has the result that the assembly of these devices is liable to be delicate, subject to breakdown or to modifications in the designed characteristics of operation.

These devices are moreover very costly.

For the construction of small aircraft of simplified design and relatively inexpensive, it would be feasible to effect a direct control of the flight direction by deflection of the jet, by coupling the deflection elements directly to the control-stick, but on account of the lack of inherent stability of a vertical flight aircraft, it would in such a case be necessary to make use of the action of a gyrometer, for the purpose of damping the angular speeds during pitching and yawing movements controlled by the control-stick. A gyrometer of this type must be reliable in operation and must act directly by means of a mechanical coupling on the devices which control the deflection of the jet. This implies the need for extremely substantial masses in rotation and entails a complication which is contrary to the apparent simplicity of this solution.

The present invention has for its object a device for the direct control of the flight-direction system by deflection of the jet, thereby solving this problem, and the special feature of which consists in that the rotating masses which are present to supply the main lifting jet in the aircraft are employed as a gyrometer. In the case of a turbo-jet sustentation engine, said rotating masses may consist of the turbine wheel, compressor wheel and assembly thereof.

The description which follows below with reference to the attached drawings, which are given by way of example only and without any limitation being implied, will quite clearly explain the different features of the invention and the manner in which they are carried into effect, any arrangement which is brought out, either in the text or in the drawing, being understood to come within the scope of the present invention.

Figure 1:
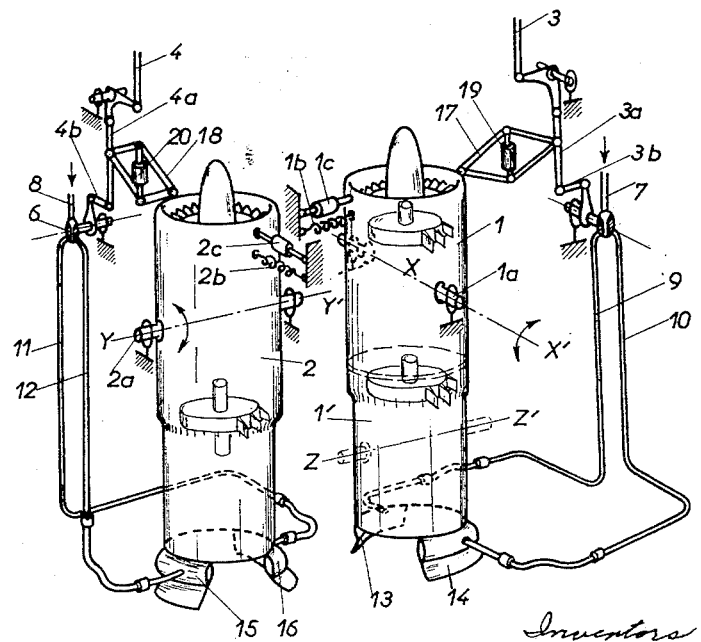

FIGURE 1 of the attached drawing is a view in diagrammatic perspective of a form of embodiment of the present invention.

FIGURE 2 shows a diagrammatic embodiment, also in perspective, of an aircraft equipped according to the invention and of the tail-sitter type.

This form of embodiment relates to the case in which the aircraft comprises two identical turbo-reactors 1 and 2, arranged vertically so as to produce two parallel lifting jets. The casings of these turbo-reactors are each fitted with a pair of pivot shafts 1a, 2a, these pairs respectively defining two axes XX' and YY' which are at right angles to each other, the axis XX' being parallel to the axis around which the yawing movements of the aircraft are effected and the axis YY' being on the other hand parallel to the axis around which the pitching movements are accomplished. The trunnions 1a, 2a are mounted in bearings on the frame of the aircraft, in such manner that the turbo-reactors can pivot respectively with respect to the aircraft about the axes XX' and YY'. The trunnions 1a, 2a which define these axes are mounted at such points that the said axes, which are at right angles to the longitudinal axes of the turbo-reactors, pass through the respective centres of gravity of these reactors.

Each turbo-reactor is also coupled to the fixed structure of the aircraft by means of a system of springs, 1b, 2b and shock-absorbers 1c, 2c. There is shown on the drawing, for each turbo-reactor, a single spring acting in tension, but it is obvious that the system of springs must be of the double-action type so as to bring the longitudinal axis of each turbo-reactor into its mean or central position, irrespective of the angular variation of position to which the said longitudinal axis has been subjected. Each turbo-reactor will therefore be associated with two springs such as 1b, 2b working on each side of the plane defined by the longitudinal axis of the turbo-reactor and the pivotal axis XX' or YY'.

The control-stick is coupled by means of link-rods 3 and 4, rocking-lever rods 3a and 4a and connecting rods 4b to the rotatable casings of two gates 5 and 6 which control the respective jets of the turbo-reactors. The link-rod system 3 is that which controls the yawing movements of the aircraft whilst the link-rod system 4 controls the pitching movements.

In this form of embodiment, the device for the deflection of the turbo-reactor jets is assumed to be of the type comprising blowing-action by auxiliary jets. It will be understood however that this device can also be of the mechanical type with spoilers or movable shutters, without thereby departing from the scope of the present invention.

Each of the gates 5, 6 is coupled to a supply 7, 8 of compressed air and comprises two outgoing pipes 9, 10 and 11, 12 respectively terminating in two diametrically opposite blowing sectors 13, 14 and 15, 16 mounted on the ejection outlet of each of the turbo-reactors. When gas under pressure, derived for instance out of the compressor casing of one reactor, is supplied to one blowing sector, the jet issuing therefrom deflects the main sustentation jet against the opposite curved extension of the exhaust nozzle. Such devices for deflecting fluid jets are described in U.S. Patent No. 2,793,493 and British Patent No. 750,687. Another embodiment which also may be used is described in U.S. Patent No. 2,812,636.

There is also provided between the link-rods 3, 4 and the turbo-reactors a mechanical coupling so designed as to transmit to these link-rod systems the gyroscopic reaction torques produced by the rotating masses of these reactors. In the form of embodiment illustrated, each of these couplings terminates in an intermediate point of the rocking-levers 3a, 4a and comprises an articulated parallelogram, in the diagonal of which is arranged a correction or regulation device 19, 20, constituted, for example, by a remote-controlled jack.

In order to explain the operation of such a combination, it is sufficient to describe the process which takes place, for example, when a yawing movement of the aircraft is controlled. The action given to the control-stick produces an effort in the link-rod system 3. This sets up a pivotal or rocking movement of the gate-casing 5, either in one direction or the other, depending on the direction of this effort and the gate thus admits the auxiliary compressed air into one or the other of the sectors 13, 14. The deflection of the jet of the turbo-reactor 1 which is thus created, produces a moment on the reactor casing 1, the trunnions 1a and the aircraft itself, which starts on a yawing movement about its yaw axis parallel to YY'. By gyroscopic effect this yawing movement produces an angular displacement of the turbo-reactor 1, which acts as a gyrometer, about the axis XX' perpendicular to the yaw axis. This angular displacement of the turbo-reactor 1 (which must be sufficiently small so as not to produce a substantial couple about the centre of gravity of the aircraft, the movements of the turbo-reactors being limited for this purpose by a suitable calibration of the springs 1b and 2b, together with suitable abutments) reacts by means of the coupling 17 on the link-rod 3 and on the control-stick, in opposition to the action given to this latter. The action of the gyroscopic couple of the turbo-reactor 1 thus partially prevents the opening of the gate 5, in such manner as to create the angular damping which is essential for direct piloting.

The process of operation is similar when the control-stick is operated in order to displace the link-rod 4. In this case, it is the jet of the turbo-reactor 2 which is deflected so as to produce a pitching movement of the aircraft about the pitch axis of this latter, parallel to XX' and this yawing motion generates a gyroscopic couple of the turbo-reactor 2 about the axis YY', this couple acting in opposition to the opening of the gate 6.

It will be understood that the form of embodiment which has been described above has been given solely by way of example and could be modified in a number of ways without thereby departing from the scope of the invention.

For example, the device could be usefully applied to aircraft which are lifted by faired helices. In accordance with another example, in the case of a single rotating machine (monoreactor aircraft) the rotating masses of this machine (compressor and turbine wheels) could be divided into two parts, connected by universal joints the casings of which would have a freedom of movement of small amplitude about axes respectively parallel to the axis of the yawing motion and to the axis of the pitching motion of the aircraft, as indicated in FIGURE 1, in dotted lines and under the references 1–XX' and 1'–ZZ', respectively.

What we claim is:

1. In an aircraft designed for vertical flight and to which at least a substantial part of the lift is supplied, during vertical flight or horizontal flight at low speed, by at least one jet of gas produced by a machine having a casing which supports a rotating part, a direction-control device comprising in combination: jet means for producing a control moment applied to the aircraft about a first axis of said aircraft, means for pivotally mounting said casing about a second axis perpendicular to said first axis, elastic means urging said casing to a neutral position, and linking means for applying the gyroscopic couples, generated on said rotating part and pivoted casing by the movement of the aircraft about said first axis, to manual means controlling said jet control means, in such manner as to counteract said movement of the aircraft.

2. In an aircraft designed for vertical flight and to which at least a substantial part of the lift is supplied, during vertical flight or horizontal flight at low speed, by at least one jet of gas produced by a machine having a casing which supports a rotating part, a direction-control device comprising, in combination: means for deflecting said jet of gas about a first axis of said aircraft, means for pivotally mounting said casing about a second axis perpendicular to said first axis, elastic means urging said casing to a neutral position, and linking means for applying the gyroscopic couples, generated on said rotating part and pivoted casing by the movement of the aircraft about said first axis, to manual means controlling said deflecting means, in such manner as to counteract said movement of the aircraft.

3. In an aircraft designed for vertical flight and to which at least a substantial part of the lift is supplied, during vertical flight or horizontal flight at low speed, by several jets of gas produced by at least two machines each having a casing which supports a rotating part, a direction-control device comprising in combination: means for deflecting the jets of gas relative to said two machines, respectively, about two perpendicular axes of said aircraft such as its pitch and yaw axes, means for pivotally mounting the casings of said two machines, respectively, about axes parallel to the yaw and pitch axes of said aircraft, elastic means urging each of said casings to a neutral position, and linking means for applying the gyroscopic couples, generated on said rotating parts and pivoted casings by the movements of the aircraft about its pitch and yaw axes, to manual means, respectively, controlling said deflecting means, in such manner as to counteract said movements of the aircraft.

4. In an aircraft designed for vertical flight and to which at least a substantial part of the lift is supplied, during vertical flight or horizontal flight at low speed, by at least one jet of gas produced by a machine having two rotating parts supported in independent casings, a direction-control device comprising, in combination: means for deflecting said jet of gas about the pitch and yaw axes of said aircraft, means for pivotally mounting said independent casings, respectively, about axes parallel to the yaw and pitch axes of said aircraft, elastic means urging each of said casings to a neutral position, and linking means for applying the gyroscopic couples, generated on said rotating parts and pivoted casings by the movement of the aircraft about its pitch and yaw axes, to manual means, respectively, controlling said deflecting means, in such manner as to counteract said movements of the aircraft.

5. A direction-control device as claimed in claim 1 in which said linking means are adjustable, by means of an articulated parallelogram inserted along one diagonal and equipped, along its other diagonal, with a remote-controlled jack, and in which damping means assists said elastic means urging to a neutral position the pivoted casing of the machine.

References Cited in the file of this patent
UNITED STATES PATENTS

| | | |
|---|---|---|
| 1,431,244 | Mendel | Oct. 10, 1922 |
| 2,850,977 | Pollack | Sept. 9, 1958 |
| 2,926,868 | Taylor | Mar. 1, 1960 |